United States Patent
Hosseini et al.

(10) Patent No.: US 11,770,799 B2
(45) Date of Patent: Sep. 26, 2023

(54) CONCURRENT COMMUNICATION CONDITIONS FOR SIDELINK

(71) Applicant: QUALCOMM Incorporated, San Diego, CA (US)

(72) Inventors: Seyedkianoush Hosseini, San Diego, CA (US); Hung Dinh Ly, San Diego, CA (US); Gokul Sridharan, Sunnyvale, CA (US); Wei Yang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 17/152,616

(22) Filed: Jan. 19, 2021

(65) Prior Publication Data

US 2021/0227504 A1      Jul. 22, 2021

Related U.S. Application Data

(60) Provisional application No. 62/964,111, filed on Jan. 21, 2020.

(51) Int. Cl.
*H04W 4/00* (2018.01)
*H04W 72/02* (2009.01)
*H04L 27/26* (2006.01)
*H04W 72/0453* (2023.01)
*H04W 72/0446* (2023.01)

(52) U.S. Cl.
CPC ....... *H04W 72/02* (2013.01); *H04L 27/26025* (2021.01); *H04W 72/0446* (2013.01); *H04W 72/0453* (2013.01)

(58) Field of Classification Search
None
See application file for complete search history.

(56) References Cited

U.S. PATENT DOCUMENTS

| 11,252,753 B2 * | 2/2022 | Chen ................... H04L 1/1822 |
| 2020/0045697 A1 * | 2/2020 | Choi .................. H04W 72/042 |

FOREIGN PATENT DOCUMENTS

WO      2019061195 A1      4/2019

OTHER PUBLICATIONS

Huawei, et al., "BWP Operation for V2X Sidelink," 3GPP Draft, 3GPP TSG RAN WG1 Meeting #97, R1-1906597, vol. RAN WG1, No. Reno, USA, May 13-17, 2019, (May 13, 2019), XP051728048, 4 pages, Retrieved from the Internet: URL: http://www.3gpp.org/ftp/Meetings%5F3GPP%5FSYNC/RAN1/Docs/R1%2D1906597%2Ezip, the whole document.

(Continued)

*Primary Examiner* — Zewdu A Beyen
(74) *Attorney, Agent, or Firm* — Danai Nelisile Mhembere; Patterson & Sheridan, LLP

(57) ABSTRACT

Certain aspects provide a method for wireless communication. The method generally includes determining a first configuration for sidelink (SL) communication by a user-equipment (UE), determining a second configuration for uplink (UL) or downlink (DL) communication by the UE, the first configuration and the second configuration being determined to allow the UL or DL communication to overlap in time domain with the SL communication, and transmitting the first configuration and the second configuration to the UE.

26 Claims, 10 Drawing Sheets

(56) References Cited

OTHER PUBLICATIONS

Huawei, et al., "On Relationship Between SL BWP and Uu BWP," 3GPP Draft, 3GPP TSG RAN WG1 Meeting #95, R1-1814304, vol. RAN WG1, No. Spokane, USA, Nov. 12-16, 2018, Nov. 19, 2018 (Nov. 19, 2018), XP051494757, 3 pages, Retrieved from the Internet: URL: http://www.3gpp.org/ftp/tsg%5Fran/WG1%5FRL1/TSGR1%5F95/Docs/R1%2D1814304%2Ezip , the whole document.
International Search Report and Written Opinion—PCT/US2021/014223—ISA/EPO—dated May 7, 2021.
OPPO: "Discussion on UL and SL Prioritization for NR-V2X," 3GPP Draft, 3GPP TSG-RAN WG1 Meeting #98bis, R1-1910377, OPPO—LS Discussion, 3rd Generation Partnership Project (3GPP), Mobile Competence Centre, 650, Route Des Lucioles, F-06921, Sophia-Antipolis Cedex, France, vol. RAN WG1, No. Chongqing, China; Oct. 14, 2019-Oct. 20, 2019, Oct. 8, 2019 (Oct. 8, 2019), XP051809107, 6 pages, Discussion on Q1, Secs. 3 and 4, p. 1-5.

\* cited by examiner

CONCURRENT COMMUNICATION CONDITIONS FOR SIDELINK

CROSS-REFERENCE TO RELATED APPLICATION

This application claims benefit of and priority to U.S. Provisional Application No. 62/964,111, filed Jan. 21, 2020, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for sidelink communication.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved feedback signaling.

Certain aspects provide a method for wireless communication by a base station. The method generally includes: determining a first configuration for sidelink (SL) communication by a user-equipment (UE); determining a second configuration for uplink (UL) or downlink (DL) communication by the UE, the first configuration and the second configuration being determined to allow the UL or DL communication to overlap in time domain with the SL communication on same or different carriers based on one or more conditions; and transmitting the first configuration and the second configuration to the UE.

Certain aspects provide a method for wireless communication by a UE. The method generally includes receiving a first configuration for SL communication by the UE; receiving a second configuration for UL or DL communication by the UE; determining whether the first configuration and the second configuration allow the UL or DL communication to overlap in time domain with the SL communication on same or different carriers based on one or more conditions; and communicating signaling for at least one of the SL communication or the UL or DL communication based on the determination.

Certain aspects provide an apparatus for wireless communication by a base station. The apparatus generally includes a memory, and one or more processors coupled to the memory, the one or more processors and the memory being configured to: determine a first configuration for sidelink (SL) communication by a UE; determine a second configuration for UL or DL communication by the UE, the first configuration and the second configuration being determined to allow the UL or DL communication to overlap in time domain with the SL communication on same or different carriers based on one or more conditions; and transmit the first configuration and the second configuration to the UE.

Certain aspects provide an apparatus for wireless communication by a UE. The apparatus generally includes a memory, and one or more processors coupled to the memory, the one or more processors and the memory being configured to: receive a first configuration for SL communication by the UE; receive a second configuration for UL or DL communication by the UE; determine whether the first configuration and the second configuration allow the UL or DL communication to overlap in time domain with the SL communication on same or different carriers based on one or more conditions; and communicate signaling for at least one of the SL communication or the UL or DL communication based on the determination.

Certain aspects provide an apparatus for wireless communication by a base station. The apparatus generally includes: means for determining a first configuration for SL communication by a UE; means for determining a second configuration for UL or DL communication by the UE, the first configuration and the second configuration being determined to allow the UL or DL communication to overlap in time domain with the SL communication on same or different carriers based on one or more conditions; and means for transmitting the first configuration and the second configuration to the UE.

Certain aspects provide an apparatus for wireless communication by a UE. The apparatus generally includes means for receiving a first configuration for SL communication by the UE; means for receiving a second configuration for UL or DL communication by the UE; means for determining whether the first configuration and the second configuration allow the UL or DL communication to overlap in time domain with the SL communication on same or different carriers based on one or more conditions; and means for communicating signaling for at least one of the SL communication or the UL or DL communication based on the determination.

Certain aspects provide a computer-readable medium having instructions stored thereon to cause a base station to: determine a first configuration for SL communication by a UE; determine a second configuration for UL or DL communication by the UE, the first configuration and the second configuration being determined to allow the UL or DL communication to overlap in time domain with the SL communication on same or different carriers based on one or more conditions; and transmit the first configuration and the second configuration to the UE.

Certain aspects provide a computer-readable medium having instructions stored thereon to cause a UE to: receive a first configuration for SL communication by the UE; receive a second configuration for UL or DL communication by the UE; determine whether the first configuration and the second configuration allow the UL or DL communication to overlap in time domain with the SL communication on same or different carriers based on one or more conditions; and communicate signaling for at least one of the SL communication or the UL or DL communication based on the determination.

Certain aspects provide a method for wireless communication. The method generally includes determining a first configuration for SL communication by a UE, determining a second configuration for UL or DL communication by the UE, the first configuration and the second configuration being determined to allow the UL or DL communication to overlap in time domain with the SL communication, and transmitting the first configuration and the second configuration to the UE.

Certain aspects provide a method for wireless communication by a UE. The method generally includes receiving a first configuration for SL communication by the UE, receiving a second configuration for UL or DL communication by the UE, determining whether the first configuration and the second configuration allow the UL or DL communication to overlap in time domain with the SL communication, and performing at least one of the SL communication or the UL or DL communication based on the determination.

Certain aspects provide an apparatus for wireless communication. The apparatus generally includes a memory and a processor coupled to the memory, the processor and the memory being configured to determine a first configuration for SL communication by a UE, and determine a second configuration for UL or DL communication by the UE, the first configuration and the second configuration being determined to allow the UL or DL communication to overlap in time domain with the SL communication, and a transmitter coupled to the processor and configured to transmit the first configuration and the second configuration to the UE.

Certain aspects provide an apparatus for wireless communication. The apparatus generally includes a memory and a processor coupled to the memory, the processor and the memory being configured to receive a first configuration for SL communication by the UE, receive a second configuration for UL or DL communication by the UE, determine whether the first configuration and the second configuration allow the UL or DL communication to overlap in time domain with the SL communication, and perform at least one of the SL communication or the UL or DL communication based on the determination.

Certain aspects provide an apparatus for wireless communication. The apparatus generally includes means for determining a first configuration for SL communication by a UE, means for determining a second configuration for UL or DL communication by the UE, the first configuration and the second configuration being determined to allow the UL or DL communication to overlap in time domain with the SL communication, and means for transmitting the first configuration and the second configuration to the UE.

Certain aspects provide an apparatus for wireless communication by a UE. The apparatus generally includes means for receiving a first configuration for SL communication by the UE, means for receiving a second configuration for UL or DL communication by the UE, means for determining whether the first configuration and the second configuration allow the UL or DL communication to overlap in time domain with the SL communication, and means for performing at least one of the SL communication or the UL or DL communication based on the determination.

Certain aspects provide a computer-readable medium having instructions stored thereon to cause a processor to determine a first configuration for SL communication by a UE, determine a second configuration for UL or DL communication by the UE, the first configuration and the second configuration being determined to allow the UL or DL communication to overlap in time domain with the SL communication, and transmit the first configuration and the second configuration to the UE.

Certain aspects provide a computer-readable medium having instructions stored thereon to cause a UE to receive a first configuration for SL communication by the UE, receive a second configuration for UL or DL communication by the UE, determining whether the first configuration and the second configuration allow the UL or DL communication to overlap in time domain with the SL communication, and perform at least one of the SL communication or the UL or DL communication based on the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
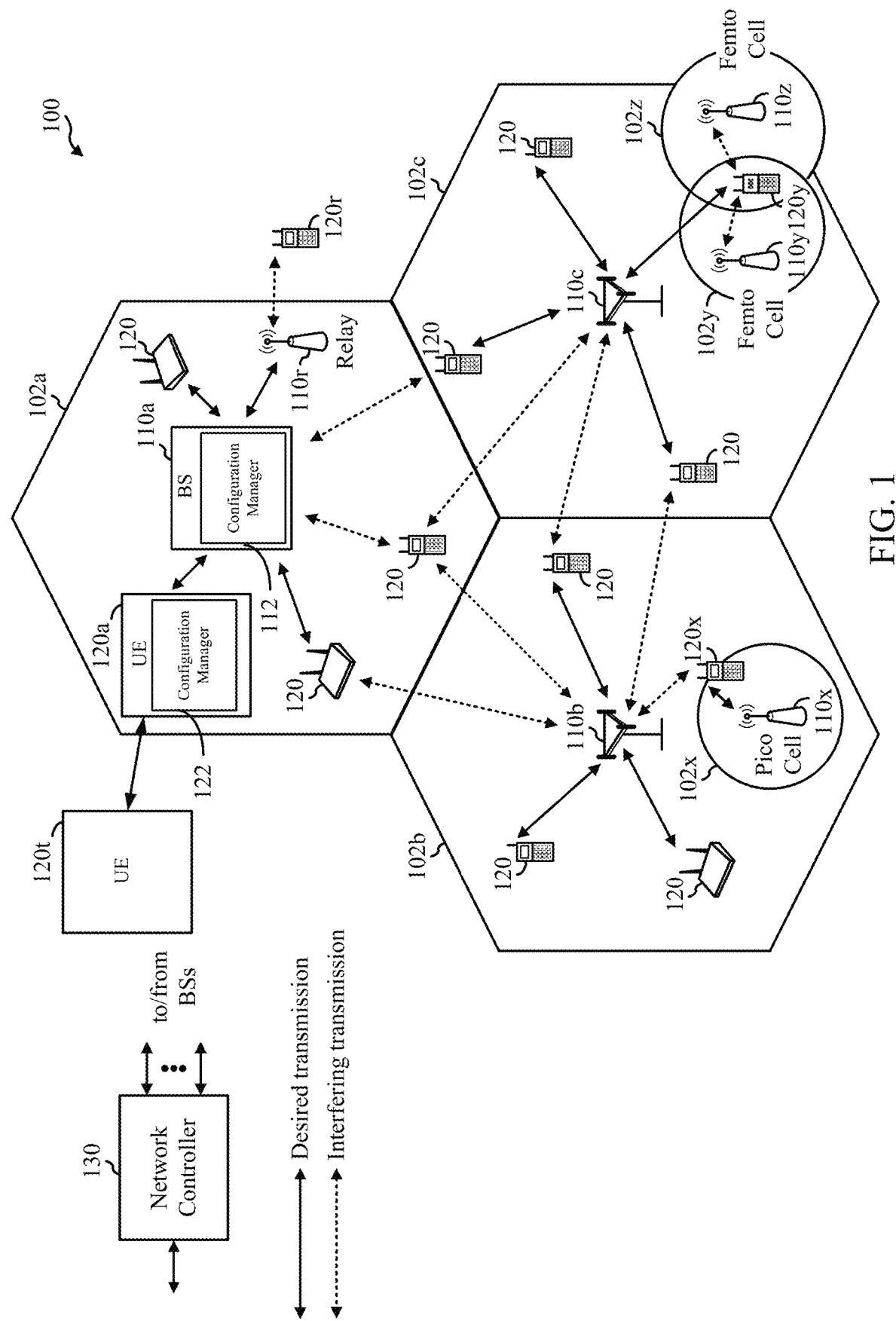
FIG. 1 is a block diagram conceptually illustrating an example telecommunications system, in accordance with certain aspects of the present disclosure.

Aspects of the present disclosure provide apparatus, methods, processing systems, and computer-readable mediums for configuring sidelink (SL) communication and uplink (UL) or downlink (DL) communication. A link between a user-equipment (UE) and a base station (BS) for UL or DL communication may also be referred to as a Uu link. In certain aspects, the BS may deploy a configuration for the SL and Uu link that allows for communications on the SL and Uu link to overlap in the time domain (e.g., simultaneous SL and Uu link communications). Certain aspects of the present disclosure provide conditions that may be considered by the BS for the deployment of the SL and Uu links that allow for concurrent SL and Uu link communications. If the deployment of the SL and Uu link by the BS does not allow for the SL and Uu link communications to overlap in the time domain, certain aspects provide techniques for handling such a scenario. For example, the UE may drop one of the SL and Uu link communications in accordance with a priority associated with the communications, as described in more detail herein. The aspects described herein provide increase communication efficiency by facilitating concurrent communications between UEs and between base stations.

The following description provides examples of configurations for concurrent SL communication and UL or DL communication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for concurrent SL communication and UL or DL communication. As shown in FIG. 1, the UE 120a includes a configuration manager 122. The configuration manager 122 may be configured to receive a first configuration for sidelink (SL) communication by the UE, receive a second configuration for uplink (UL) or downlink (DL) communication by the UE, determine whether the first configuration and the second configuration allow the UL or DL communication to overlap in time domain with the SL communication, and perform at least one of the SL communication or the UL or DL communication based on the determination. In certain aspects, the BS 110 may include a configuration manager 112 configured to determine a first configuration for SL communication by a UE, determining a second configuration for UL or DL communication by the UE, the first configuration and the second configuration being determined to allow the UL or DL communication to overlap in time domain with the SL communication, and transmitting the first configuration and the second configuration to the UE.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
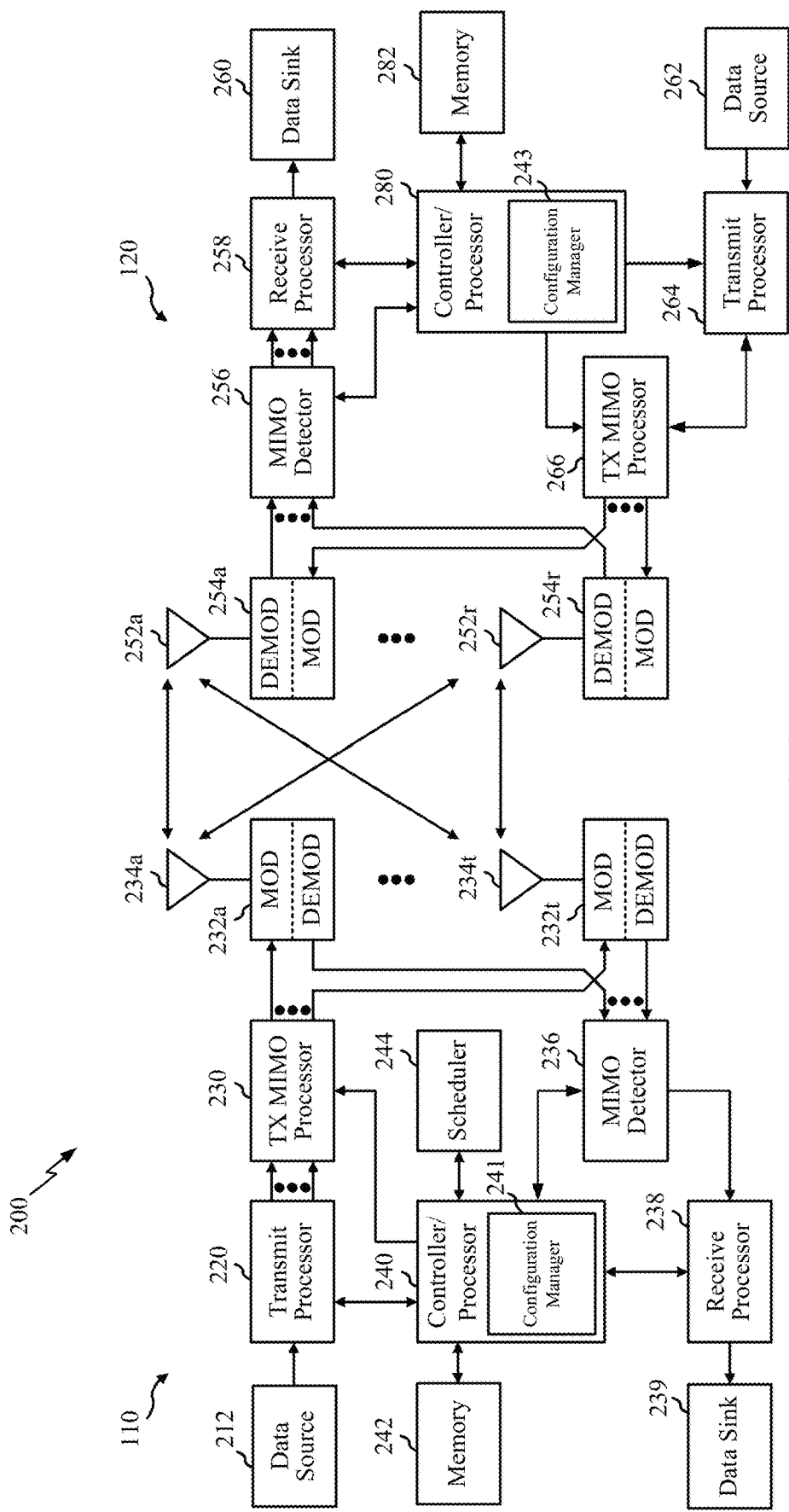
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has a configuration manager 243 that may be configured to receive a first configuration for SL communication by the UE, receive a second configuration for UL or DL communication by the UE, determine whether the first configuration and the second configuration allow the UL or DL communication to overlap in time domain with the SL communication, and perform at least one of the SL communication or the UL or DL communication based on the determination. In certain aspects, the controller/processor 240 may include a configuration manager 241 configured to determine a first configuration for SL communication by a UE, determining a second configuration for UL or DL communication by the UE, the first configuration and the second configuration being determined to allow the UL or DL communication to overlap in time domain with the SL communication, and transmitting the first configuration and the second configuration to the UE. Although shown at the Controller/Processor, other components of the UE 120a and BS 110a may be used performing the operations described herein.

Figure 3:
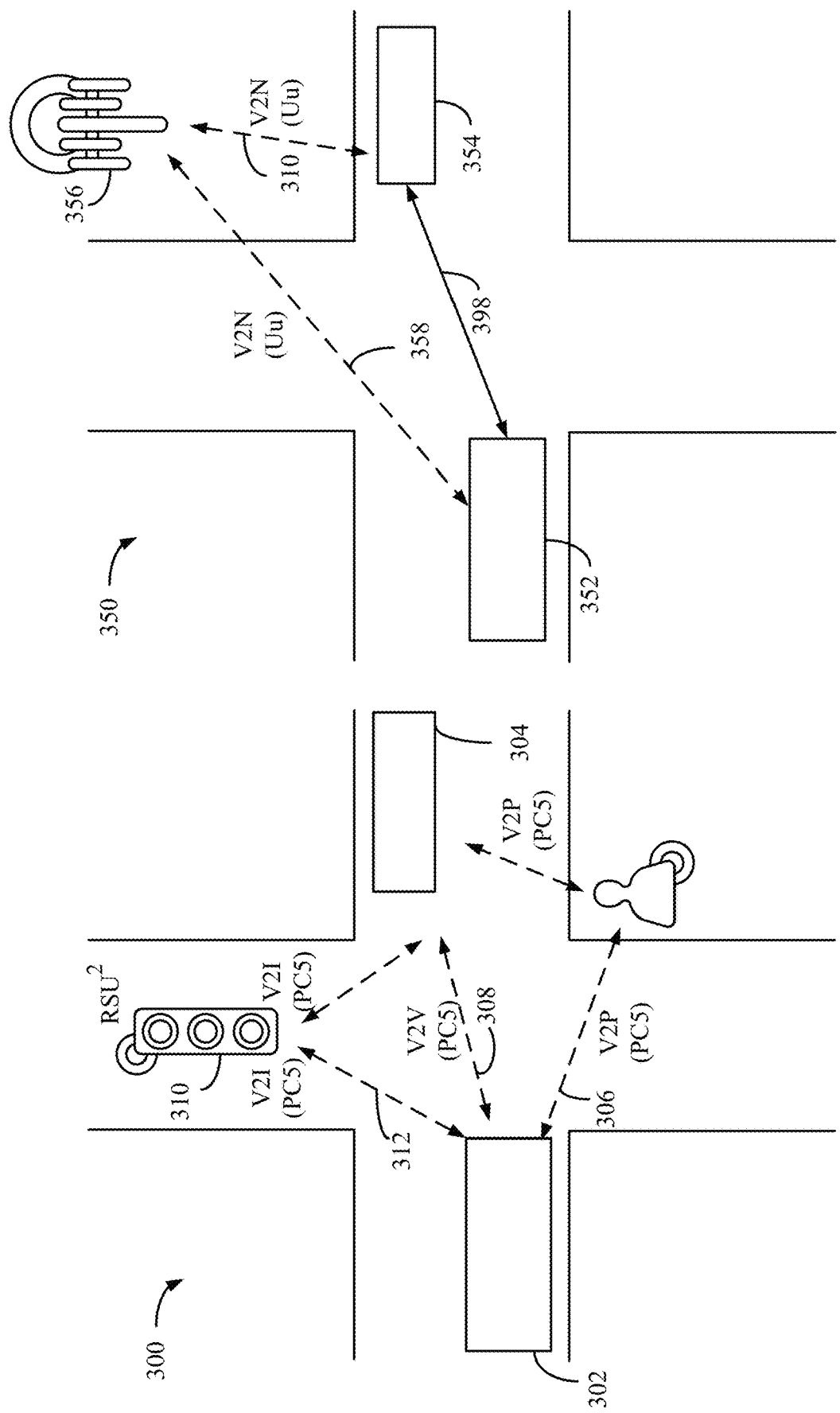
FIGS. 3A and 3B show diagrammatic representations of example vehicle to everything (V2X) systems in accordance with some aspects of the present disclosure.

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE). As illustrated, UEs 352, 354 may communicate with each other using a sidelink (SL) 398.

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links (e.g., Uu links 358 and 310) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Example Techniques for Concurrent Communications

As described herein, two user equipments (UEs) may communicate over sidelink (SL), while one or both of the UEs may be in communication with a base station over Uu link (e.g., link between the UE and base station (BS)). As used herein, Uu link generally refers to uplink (UL) or downlink (DL). Both UEs may, at any given time, be instructed to transmit over SL and Uu link. In this case, the transmissions may collide (e.g., overlap) at least in the time domain. As used herein, simultaneous (or concurrent) transmissions (Tx) refer to the transmissions at least partially overlapping in the time domain, and simultaneous receptions (Rx) refers to receptions at least partially overlapping in the time domain.

In some cases, SL reception (and transmission) may only happen over semi-static U symbols (e.g., designated uplink symbols), while Uu reception may happen over D symbols (e.g., designated downlink symbols) and flexible symbols (e.g., symbols that may be configured for uplink or downlink). Thus, Uu and SL receptions may not collide in time in this case. However, one or more examples, SL Tx/Rx over the flexible symbols may be allowed. In such a case, the reception of signals on Uu and SL may collide. Further, for SL transmission, only Cyclic-Prefix Orthogonal Frequency Division Multiplexing (CP-OFDM) waveform may be allowed; however, for Uu Tx, both CP-OFDM and Discrete Fourier Transform (DFT) spread (DFT-S) may be used.

In some deployment scenarios, inter-frequency inter-band operations may be implemented. For example, for UEs with dual transmit (Tx)/receive (Rx) chains, it may be feasible for the UE to support simultaneous transmission/reception for both synchronous and asynchronous scenarios. However, not all combinations of source/target bands may be able to support simultaneous transmission/reception for synchronous and asynchronous scenarios In some cases, inter-frequency intra-band synchronous operations may be implemented. For example, it may be feasible for UEs supporting intra-band downlink (DL) carrier aggregation (CA) on frequencies supported for CA serving cells, to support simultaneous reception. Moreover, it may be feasible for UEs supporting intra-band UL CA on frequencies supported for CA serving cells, to support simultaneous transmission. It is unclear whether simultaneous Tx and/or Rx can be supported for inter-frequency intra-band asynchronous implementations.

In some cases, intra-frequency synchronous communication may be implemented. For example, simultaneous reception may be feasible for some UEs at least if the source/target bandwidths (e.g., for dual connectivity (DC)) are the same and under some conditions. Moreover, simultaneous transmission may be feasible for UEs with a single RF chain under some conditions. For intra-frequency asynchronous implementations, simultaneous reception may also be feasible for UEs with a single RF chain.

Certain aspects of the present disclosure are directed to configurations that allow a UE to communicate using a SL channel and UL and/or DL channel concurrently. A link between a UE and a BS for UL and DL communication may also be referred to as a Uu link. Certain aspects may be implemented for concurrent Rx and/or Tx for a UE with both synchronous and asynchronous deployments, as described in more detail herein. Synchronous SL and Uu link communication generally refer to a scenario where SL and Uu carriers (also referred to as component carriers) are co-located and the slot boundaries for the SL and Uu link are aligned within a small margin. Asynchronous SL and Uu link communication generally refer to a scenario where SL and Uu carriers are non-collocated.

Certain aspects of the present disclosure provide configurations for concurrent Tx/Rx communication for various implementations. The various implementations may include SL and Uu bandwidth parts (BWPs) being configured on the same carrier, or SL and Uu BWPs being configured on different carriers. Where the SL and Uu BWPs are configured on different carriers, the UE may use a single RF chain for Tx/RX on these carriers (e.g., intra-band contiguous carriers), or the UE may use more than a single RF chain for Tx/Rx on these carriers (e.g., intra-band non-contiguous or inter-band carriers). Depending on the implementation for SL and Uu link, the BS may configure the SL and Uu link based on one or more conditions that allow for the communications on SL and Uu link to overlap. These conditions may include using the same subcarrier spacing for the SL and Uu link, or using the same wave form for the SL or Uu link, as described in more detail herein.

Figure 4:
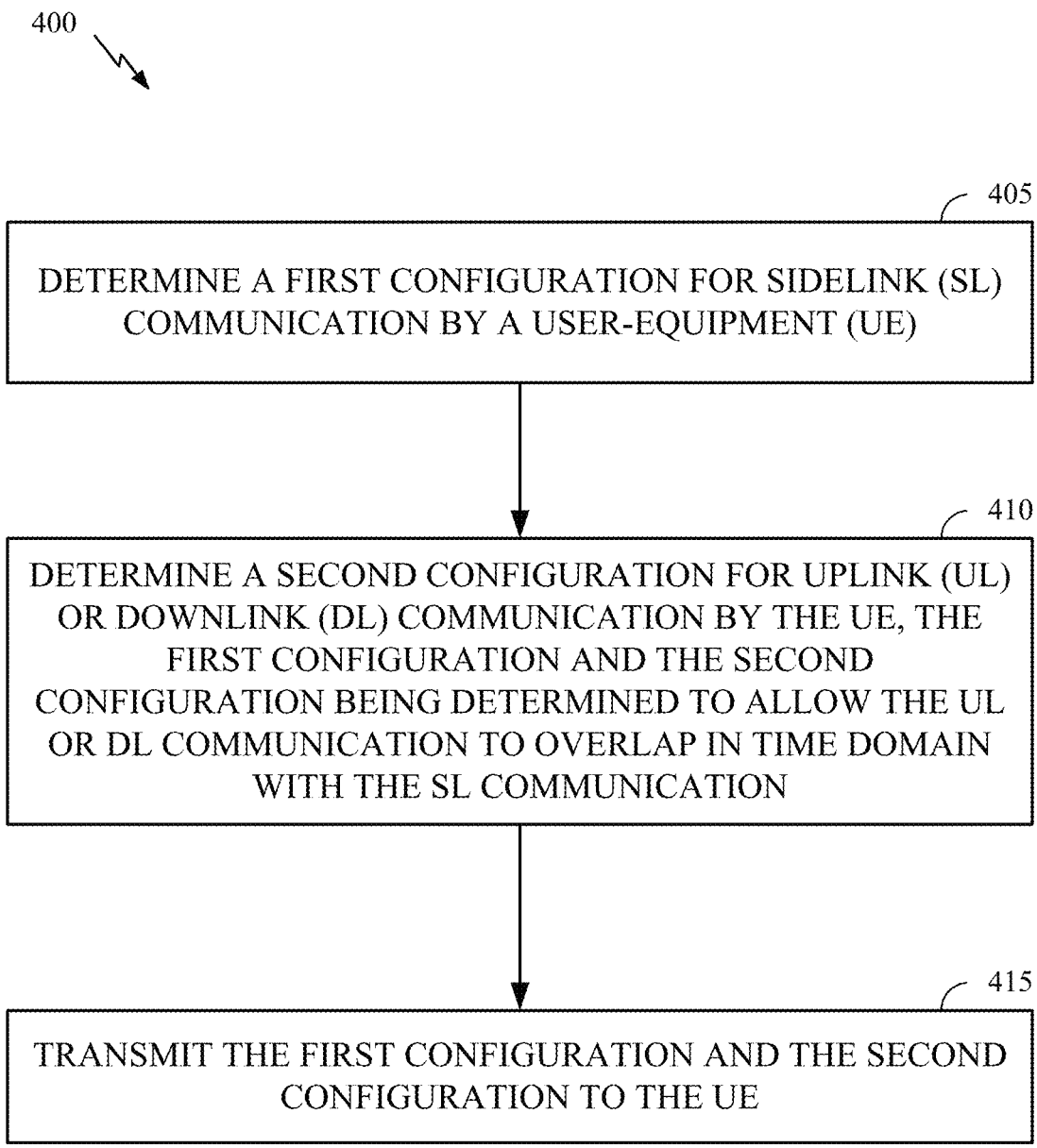
FIG. 4 is a flow diagram illustrating example operations for wireless communication, in accordance with certain aspects of the present disclosure.

FIG. 4 is a flow diagram illustrating example operations 400 for wireless communication, in accordance with certain aspects of the present disclosure. The operations 400 may be performed, for example, by a BS (e.g., such as the BS 110a in the wireless communication network 100).

Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 may begin, at block 405, with the BS determining a first configuration for SL communication by a UE, and at block 410, determining a second configuration for UL or DL communication (e.g., via Uu link) by the UE. In certain aspects, the first configuration and the second configuration may be determined to allow the UL or DL communication (e.g., Uu link communication) to overlap in time-domain with the SL communication on the same or different carriers based on one or more conditions. At block 415, the BS may transmit the first configuration and the second configuration to the UE.

In some aspects, if bandwidth parts (BWPs) for the UL or DL communication and the SL communication are on the same carrier, the first configuration and the second configuration may be determined based on the one or more conditions that the same sub-carrier spacing (SCS) is to be used for the UL or DL communication as the SL communication. In other words, SL and Uu BWPs may be configured on the same carrier, as described herein. In this case, to allow concurrent SL and Uu link communication, the SL SCS may be configured to be the same as the SCS of the UL BWP on the Uu.

Figure 5:
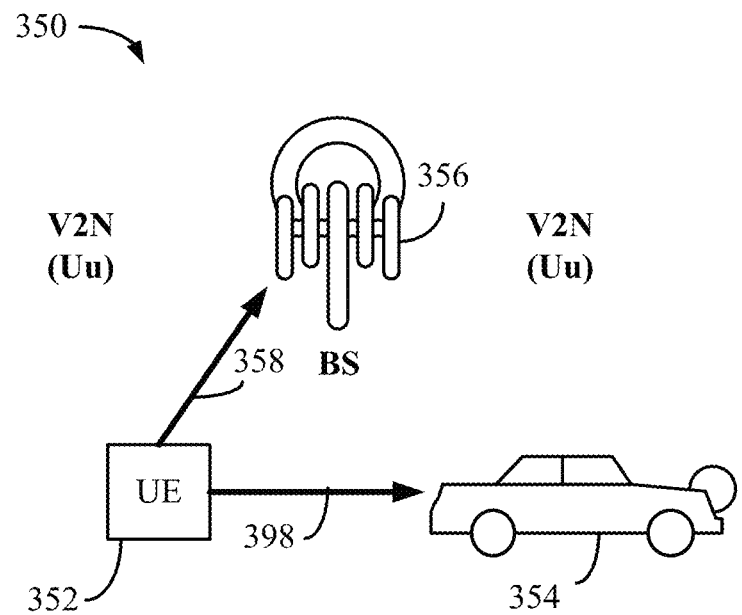
FIG. 5 illustrates a communication scenario with concurrent transmissions by a UE, in accordance with certain aspects of the present disclosure.

FIG. 5 illustrates a communication scenario with concurrent transmissions by the UE on the SL 398 and the Uu link 358, in accordance with certain aspects of the present disclosure. For simultaneous transmission, one or more conditions may apply when SL and Uu BWPs are on the same carrier. For example, the same waveform may be configured for the SL and Uu link. As described herein, the SL may only use OFDM. Thus, the configuration for the Uu link may also be set to OFDM. Otherwise, the UE may consider the configuration as an error case or use prioritization to drop one of the SL and Uu link communication, as described in more detail herein. Moreover, SL BWP may be configured within the Uu UL BWP. For a UE with multiple radio-frequency (RF) chains (also referred to as "chains") or UL multiple-input multiple-output (MIMO) capability, one or more of the conditions for concurrent SL and Uu link communication may be relaxed.

Figure 6:
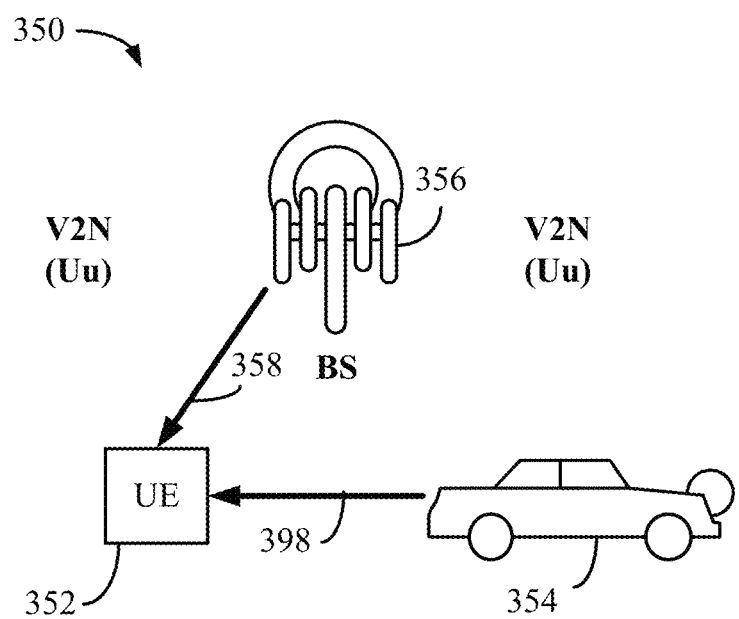
FIG. 6 illustrates a communication scenario with concurrent reception at a UE, in accordance with certain aspects of the present disclosure.

FIG. 6 illustrates a communication scenario with concurrent reception at the UE on the SL 398 and the Uu link 358, in accordance with certain aspects of the present disclosure. One or more conditions may apply for configuring SL and Uu link communications for simultaneous reception. For example, the same SCS for the Uu link DL BWP and SL BWP may be configured.

In certain deployments, the SL and Uu BWP may be on different CCs and the UE may be configured with a single RF chain. In this case, various conditions may be applied for the configuration of concurrent SL or Uu link communication. For example, one or more conditions may apply to allow for simultaneous transmission (e.g., as illustrated in FIG. 5) for synchronous communication. These conditions may include configuring the transmit timing via cells for the SL within a maximum transmitted time difference (MTTD) threshold. The MTTD threshold indicates a relative transmission timing difference among slot timing boundaries of different carriers for the SL and Uu link transmissions. The same SCS may be configured for Uu UL BWP on one carrier and SL on another carrier in certain aspects. For UEs, supporting UL CA with different SCSs in the same band or band combination, this condition may be relaxed, allowing the SCSs for the Uu UL BWP and the SL to be different.

In certain aspects, the same uplink waveform may be configured for the communications on the SL and Uu link. If the Uu and SL carriers/BWPs are configured with different waveforms, then either collision should be avoided by the scheduler (e.g., TDM only) or dropping rules may be considered, as described in more detail herein.

In certain aspects, the CCs that are configured for the SL and Uu link transmissions may be in the same timing advance group (TAG). Carriers in the same TAG may be associated with the same timing advance (TA). In certain aspects, the CCs configured for the SL and Uu link transmissions may be contiguous. Moreover, certain power control conditions may be considered when configuring the SL and Uu link transmissions. For example, the transmission power for the Uu UL and SL may be configured to be within a margin (e.g., also referred to herein as a threshold margin) or the average power per physical resource block (PRB) for the SL and Uu link transmissions may be aligned (e.g., configured to be the same) across assigned carriers.

In certain aspects, various conditions may be considered when configuring a UE in a manner as to allow simultaneous SL and Uu link reception in a synchronous scenario. For example, the configuration may be determined based on the condition that the SCS is the same for both cells used for the SL and Uu link reception at the UE. However, this condition may be relaxed for UEs that support DL CA with different SCSs in the same band or band combination. Violating the conditions may be considered as an error event or handled by prioritization, as described in more detail herein.

In certain aspects, SL and Uu BWP on different CCs and for UEs with a single chain (e.g., CCs are intra-band) may be implemented for an asynchronous scenario. For example, simultaneous transmission for an asynchronous scenario may be configured for UEs that support UL CA in the same band or band combination. If concurrent Tx/Rx is not feasible for a particular UE, then either the BS should avoid overlap of SL and Uu link communication in the time domain or such a configuration may be handled by the UE based on defining some priority rules for dropping one of the SL or Uu link communications.

In certain aspects, the SL and Uu BWPs may be on different CCs and the UE may be implemented with at least two RF chains (e.g., the different CCs are inter-band). In this case, certain conditions may apply for concurrent SL and Uu link communication. Simultaneous transmission/reception may be configured for both synchronous and asynchronous deployments. For simultaneous reception with an asynchronous deployment, a separation between the carrier frequencies may be configured. In other words, the carrier frequencies used for the SL and Uu link communications may be separated by a frequency band to reduce interference between the SL and the Uu links.

In some cases, the UE may indicate its capability for simultaneous transmission/reception to the BS. The capability of the UE may be indicated separately for various configuration candidates. For example, the UE may indicate its capability if both SL and Uu link are configured on frequency range 1 (FR1), if SL is configured on FR1 and Uu link is configured on FR2, and if the Uu link is configured on FR1 and the SL is configured on FR1. The BS may then consider the UEs' capability to handle simultaneous reception/transmission using SL and Uu links for a specific configuration to be deployed.

While certain aspects of the present disclosure have described conditions that allow concurrent communication on the SL and Uu link, there are scenarios where the BS may not configure the SL and Uu links in accordance with the conditions described herein. For example, for the Uu link, if Discrete Fourier Transform (DFT) spread (DFT-S) in the UL is configured, concurrent SL and Uu link communication may not be possible because SL may only support OFDM. Thus, the UE may expect to transmit using the SL and Uu link using non-overlapping time resources. For example, overlapping may be avoided by scheduling or time-division multiplexing (TDMing). In other words, the UE may consider an overlap of SL and Uu link communication as an error event if the configurations of the SL and the Uu link do not meet the conditions that allow for the overlap of communication in the SL and Uu link.

In certain aspects, the UE may consider prioritization rules for dropping one of the communications over the Uu link and the SL. For example, the prioritization rules may indicate that the Uu link communication has a higher priority than the SL, or vice versa. As another example, the prioritization may be based on configured priorities of channels on the SL and Uu link, or may be based on the type of channel on each of the SL and the Uu links.

Figure 7:
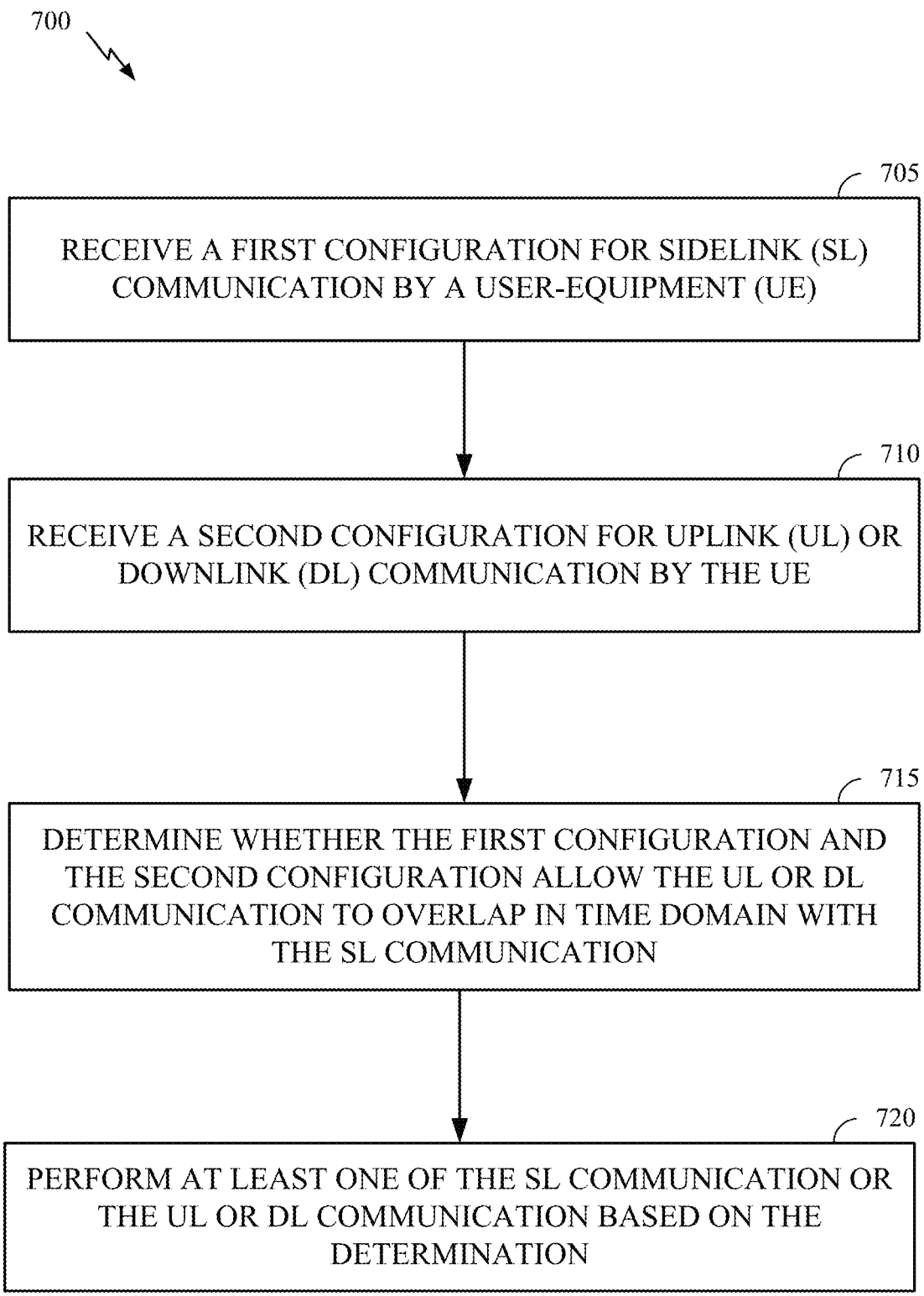
FIG. 7 is a flow diagram illustrating example operations for wireless communication, in accordance with certain aspects of the present disclosure.

FIG. 7 is a flow diagram illustrating example operations 700 for wireless communication, in accordance with certain aspects of the present disclosure. The operations 700 may be performed, for example, by UE (e.g., such as a UE 120a in the wireless communication network 100).

Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 705, by receiving a first configuration for SL communication by the UE, at block 710, receiving a second configuration for UL or DL communication by the UE. At block 715, the UE may determine whether the first configuration and the second configuration allow the UL or DL communication to overlap in time-domain with the SL communication on same or different carriers based on one or more conditions, and at block 720, communicate signaling for at least one of the SL communication or the UL or DL communication based on the determination.

In certain aspects, the UE may determine to forgo performing one of the SL communication and the UL or DL communication if the first configuration and the second configuration do not allow the UL or DL communication to overlap in the time domain with the SL communication. The determination to forgo performing one of the SL communication and the UL or DL communication may be based on a priority associated with each of the SL communication and the UL or DL communication.

Figure 8A:
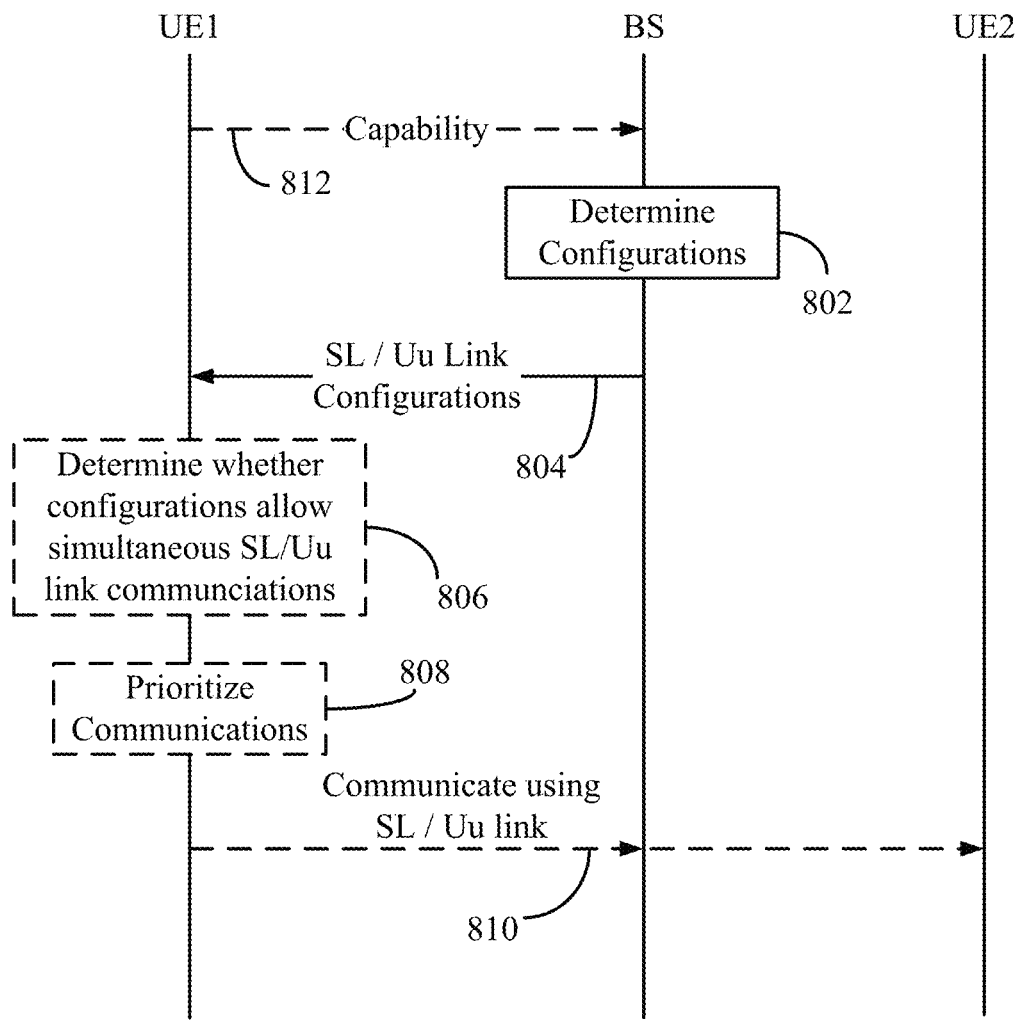
FIG. 8A is a call-flow diagram illustrating example operations for sidelink (SL), uplink (UL), or downlink (DL) communications, in accordance with certain aspects of the present disclosure.

FIG. 8A is a call-flow diagram illustrating example operations for SL or Uu communications, in accordance with certain aspects of the present disclosure. As illustrated, at block 802, the BS may determine configurations 804 for SL and Uu link. The SL and Uu link configurations may be determined to allow the Uu link communication to overlap in time domain with the SL communication on same or different carriers based on one or more conditions, as described herein. As illustrated, the BS may transmit the configurations 804 to UE1 and UE1 may use the configurations 804 for communications 810 using the SL/Uu link with the BS and UE2.

In some aspects, UE1 may optionally transmit an indication of a capability 812 of UE1 with respect to the Uu link communication overlapping in the time domain with the SL communication, as described herein. For example, the capability may be indicated separately for different bands, band combinations, the Uu link communication and SL communication being synchronous, the Uu link communication and SL communication being asynchronous, or any combination thereof.

In this case, the determination at block 802 by the BS of the configurations 804 may be based on the capability of UE1.

In some aspects, after receiving the configurations 804, the UE may, at block 806, determine whether the configurations 804 allow for the overlap in time domain of the SL communication with the Uu link communication. If not, the UE may, at block 808, prioritize one of the SL or Uu link communications. For example, if the SL communication has a lower priority as compared to the Uu link communication, UE1 may drop (e.g., forgo) one of the Uu link communication.

Figure 8B:
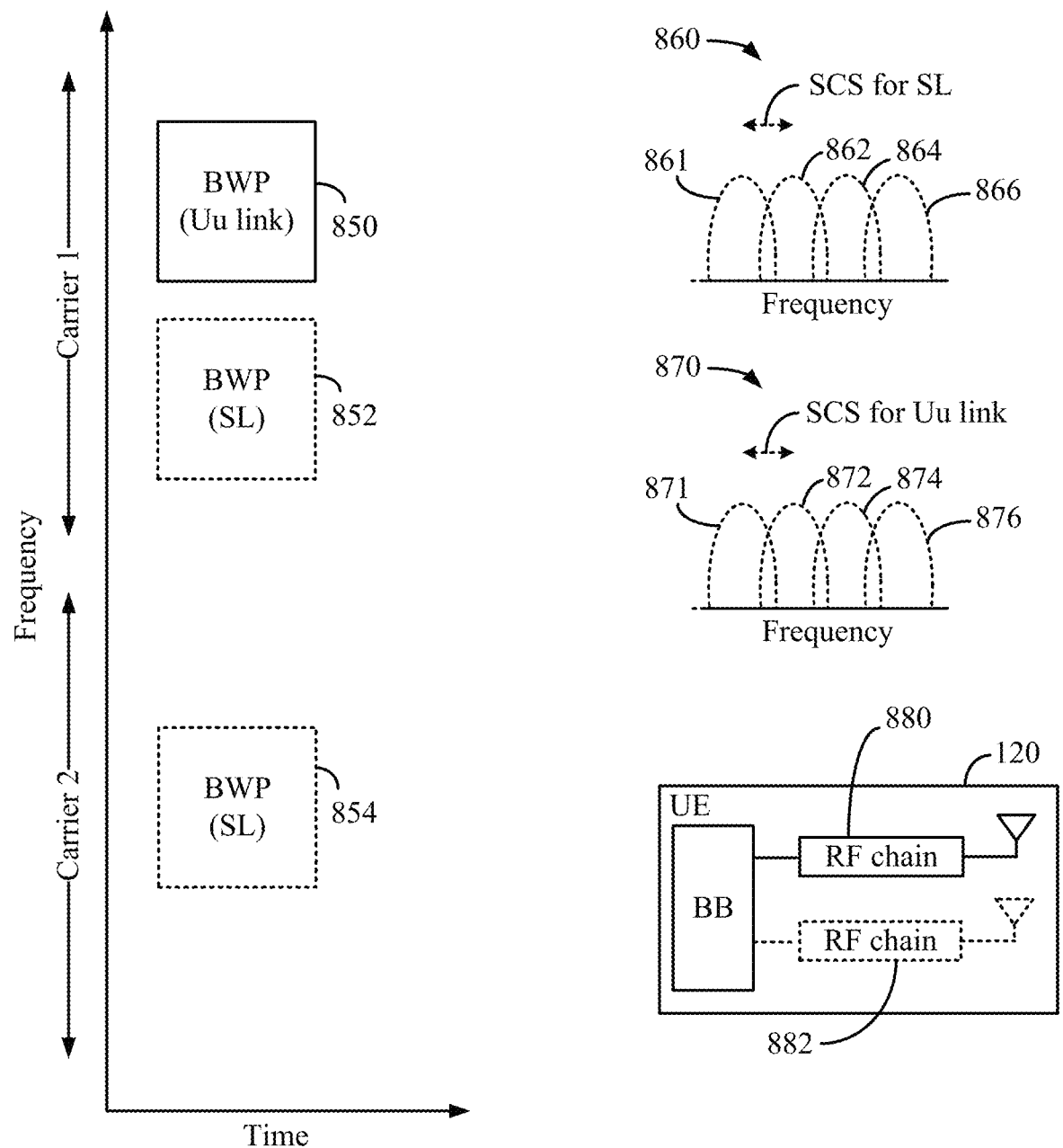
FIG. 8B illustrates multiple carriers used for SL, UL, or DL communications, in accordance with certain aspects of the present disclosure.

FIG. 8B illustrates multiple carriers used for SL and Uu link, in accordance with certain aspects of the present disclosure. In some implementations, multiple carriers (e.g., carrier 1 and carrier 2) may be assigned to the same UE to support carrier aggregation. As described with respect to FIG. 8A, at block 802, the BS may determine SL and Uu link configurations that allows for the Uu link communication to overlap in the time domain with the SL communication on same or different carriers based on one or more conditions.

For example, if overlapping BWPs for the Uu link and the SL are on the same carrier, the configurations may be determined based on a condition that the same SCS is to be used for the Uu link and SL. Diagram 860 illustrates a SCS associated with multiple subcarriers (e.g., subcarriers 861, 862, 864, 866) allocated for the SL, and diagram 870 illustrates a SCS associated with multiple subcarriers (e.g., subcarriers 871, 872, 874, 876) allocated for the Uu link. As an example, if BWP 850 is used for the Uu link on carrier 1 and BWP 852 is used for the SL on the same carrier 1, the BS may determine the configurations for SL and Uu link such that the SL and Uu link use the same SCS, as illustrated in diagrams 860, 870.

In some cases, the overlapping BWPs for the Uu link and the SL may be on different carriers. For example, BWP 850 may be used for the Uu link on carrier 1, while BWP 854 may be used for SL on carrier 2. As illustrated in FIG. 8B, a UE (e.g., UE 120) may have a single RF chain (e.g., RF chain 880), or multiple RF chains (e.g., both RF chain 880 and RF chain 882). An RF chain is a cascade of electronic components (e.g., amplifiers, filters, mixers, attenuators, detectors) that facilitate transmission or reception of signals. If the UE has a single RF chain (e.g., RF chain 880) and the BWPs for Uu link and SL are on different carriers, the configurations for the Uu link and the SL link may be determined based on the conditions described herein (e.g., the same SCS is to be used for the Uu link and SL, the same waveform is used for Uu link and SL, CCs for the Uu link and SL are contiguous, etc.).

Figure 9:
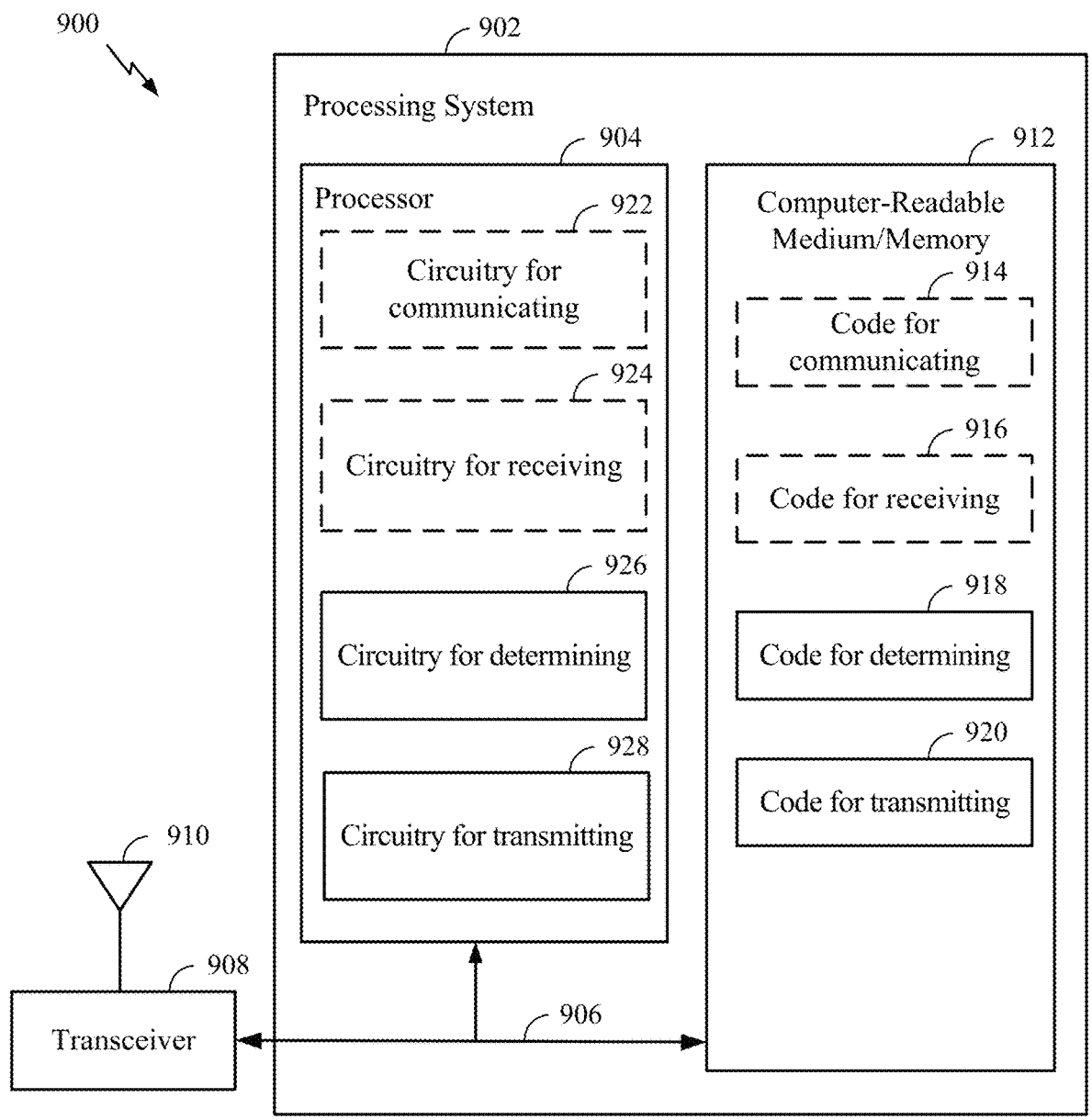
FIG. 9 illustrates a communications device that may include various components configured to perform operations for the techniques disclosed herein.

FIG. 9 illustrates a communications device 900 that may include various components (e.g., corresponding to means-plus-function components) configured to perform operations for the techniques disclosed herein, such as the operations illustrated in FIG. 4. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that, when executed by the processor 904, cause the processor 904 to perform the operations illustrated in FIG. 4. In certain aspects, computer-readable medium/memory 912 stores code 918 (e.g., an example of means for) for determining, and code 920 (e.g., an example of means for) for transmitting. In certain aspects, computer-readable medium/memory 912 optionally stores code 914 (e.g., an example of means for) for communicating; and code 916 for receiving. One or more of code 914, 916, 918, 920 may be executed by a general-purpose processor, a DSP, an ASIC, a field FPGA or other programmable logic device.

In certain aspects, the processor 904 has circuitry configured to implement the code stored in the computer-readable medium/memory 912. The processor 904 includes circuitry 926 (e.g., an example of means for) for determining; and circuitry 928 for transmitting. The processor 904 may optionally include circuitry 922 (e.g., an example of means for) for communicating; and circuitry 924 (e.g., an example of means for) for receiving. One or more of circuitry 922, 924, 926, 928 may be implemented by one or more of a general-purpose processor, a DSP, an ASIC, a FPGA or other programmable logic device. In certain aspects, processor 904 is an example of the configuration manager 112.

Figure 10:
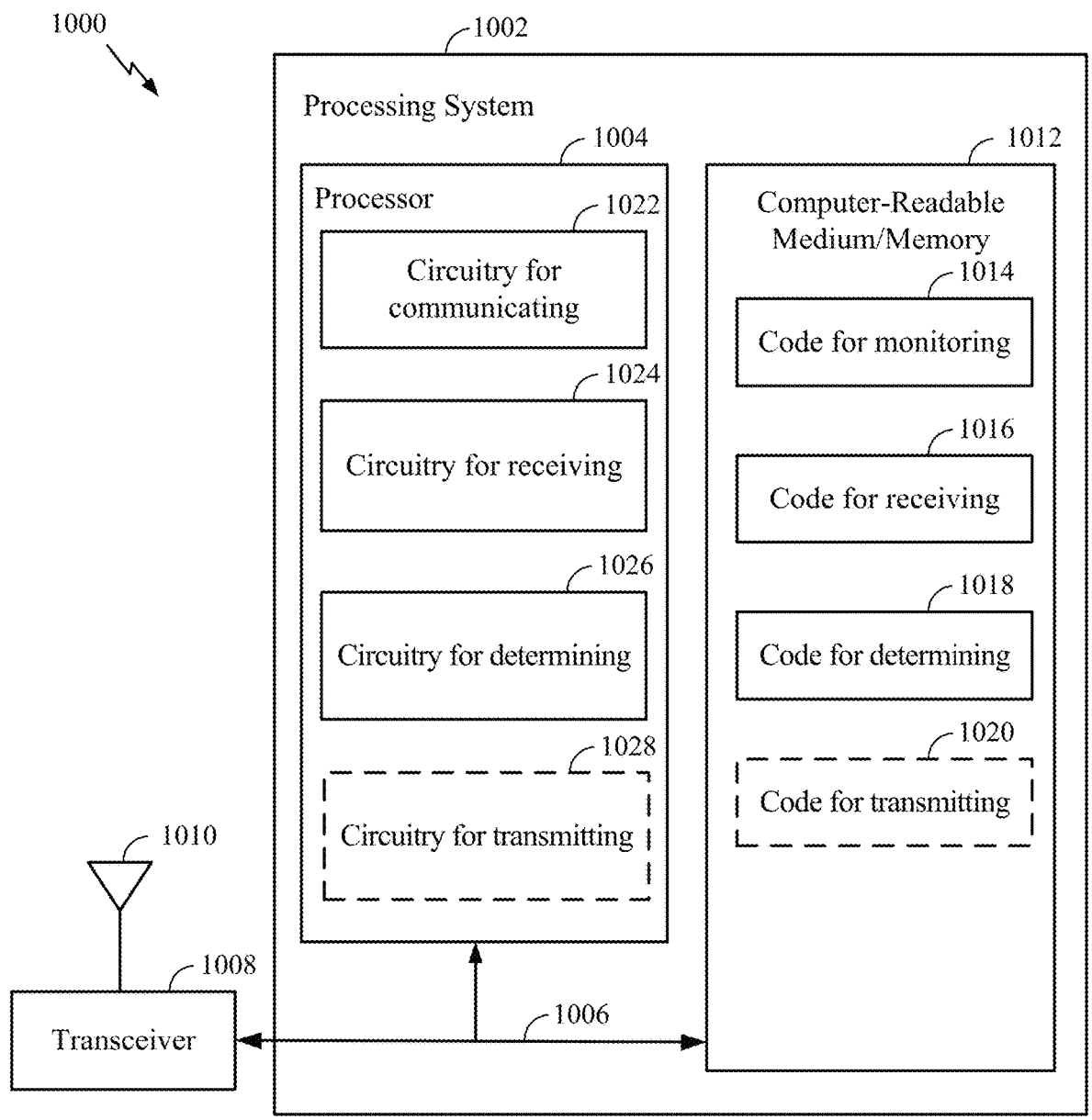
FIG. 10 illustrates a communications device that may include various components configured to perform operations for the techniques disclosed herein.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7. In certain aspects, computer-readable medium/memory 1012 stores code 1014 (e.g., an example of means for) for communicating; code 1016 for receiving, and code 1018 (e.g., an example of means for) for determining, and code 1020 (e.g., an example of means for) for transmitting. In certain aspects, computer-readable medium/memory 1012 optionally stores code 1020 (e.g., an example of means for) for transmitting. One or more of code 1014, 1016, 1018, 1020 may be executed by a general-purpose processor, a DSP, an ASIC, a field FPGA or other programmable logic device.

In certain aspects, the processor 1004 has circuitry configured to implement the code stored in the computer-readable medium/memory 1012. The processor 1004 includes circuitry 1022 (e.g., an example of means for) for communicating; circuitry 1024 (e.g., an example of means for) for receiving; circuitry 1026 (e.g., an example of means for) for determining; and circuitry 1028 for transmitting. The processor 1004 may optionally include circuitry 1028 for transmitting. One or more of circuitry 1022, 1024, 1026, 1028 may be implemented by one or more of a general-purpose processor, a DSP, an ASIC, a FPGA or other programmable logic device. In certain aspects, processor 1004 is an example of the configuration manager 122.

The transceiver 908 or 1008 may provide a means for receiving or transmitting information such as packets, user data, or control information associated with various information channels (e.g., control channels, data channels, and information related to feedback, etc.). Information may be passed on to other components of the device 900 or 1000. The transceiver 908 or 1008 may be an example of aspects of the transceiver 254 described with reference to FIG. 2. The antenna 910 or 1010 may correspond to a single antenna or a set of antennas. The transceiver 908 or 1008 may provide means for transmitting signals generated by other components of the device 900 or 1000.

The configuration manager 112 or 122 may support wireless communication in accordance with examples as disclosed herein.

The configuration manager 112 or 122 may be an example of means for performing various aspects described herein. The configuration manager 112 or 122, or its sub-components, may be implemented in hardware (e.g., in uplink resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, the configuration manager 112 or 122, or its sub-components, may be implemented in code (e.g., as configuration management software or firmware) executed by a processor, or any combination thereof. If implemented in code executed by a processor, the functions of the configuration manager 112 or 122, or its sub-components may be executed by a general-purpose processor, a DSP, an ASIC, a FPGA or other programmable logic device.

In some examples, the configuration manager 112 or 122 may be configured to perform various operations (e.g., receiving, determining, transmitting) using or otherwise in cooperation with the transceiver 908, 1008.

The configuration manager 112 or 122, or its sub-components, may be physically located at various positions, including being distributed such that portions of functions are implemented at different physical locations by one or more physical components. In some examples, the configuration manager 112 or 122, or its sub-components, may be a separate and distinct component in accordance with various aspects of the present disclosure. In some examples, the configuration manager 112 or 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Aspects

Aspect 1. A method for wireless communication by a base station, comprising: determining a first configuration for sidelink (SL) communication by a user-equipment (UE); determining a second configuration for uplink (UL) or downlink (DL) communication by the UE, the first configuration and the second configuration being determined to allow the UL or DL communication to overlap in time domain with the SL communication on same or different carriers based on one or more conditions; and transmitting the first configuration and the second configuration to the UE.

Aspect 2. The method of aspect 1, wherein, if bandwidth parts (BWPs) for the UL or DL communication and the SL communication are on the same carrier, the first configuration and the second configuration are determined based on the one or more conditions that the same sub-carrier spacing (SCS) is to be used for the UL or DL communication as the SL communication.

Aspect 3. The method of aspect 2, wherein the one or more conditions include the same SCS is to be used for the UL or DL communication as the SL communication if the UL or DL communication comprises DL reception by the UE and the SL communication comprises SL reception by the UE.

Aspect 4. The method of any one of aspects 1-3, wherein, if BWPs for the UL or DL communication and the SL communication are on the same carrier, the one or more conditions include: the UL or DL communication and the SL communication have the same waveform; the BWP for the SL communication is within a BWP for the UL or DL communication; or any combination thereof.

Aspect 5. The method of aspect 4, wherein the first configuration and the second configuration are determined based on the one or more conditions if: the UL or DL communication comprises UL transmission by the UE; and the SL communication comprises SL transmission by the UE.

Aspect 6. The method of aspect 1, wherein, if BWPs for the UL or DL communication and the SL communication are on different carriers and the different carriers are intra-band, the one or more conditions include: transmit timing via cells associated with the SL communication and the UL or DL communication are within a maximum transmitted time difference (MTTD) threshold; the same sub-carrier spacing (SCS) is to be used for the UL or DL communication as the SL communication; the UL or DL communication and the SL communication have the same waveform; component carriers for the UL or DL communication and the SL communication are in the same timing advance group (TAG); component carriers for the UL or DL communication and the SL communication are contiguous: transmission powers for the UL or DL communication and the SL communication are within a threshold margin; an average power per physical resource block (PRB) for component carriers of the UL or DL communication and the SL communication are the same; or any combination thereof.

Aspect 7. The method of aspect 6, wherein the first configuration and the second configuration are determined based on the one or more conditions if: the UL or DL communication comprises UL transmission by the UE; and the SL communication comprises sidelink transmission by the UE.

Aspect 8. The method of any one of aspects 1, 6, or 7, wherein: if the UL or DL communication and the SL communication are on the different carriers, the one or more conditions include using the same sub-carrier spacing (SCS) for the UL or DL communication as the SL communication; and the first configuration and the second configuration are determined based on the one or more conditions if: the UL or DL communication comprises DL reception by the UE; and the SL communication comprises SL reception by the UE.

Aspect 9. The method of any one of aspects 1, 6, 7, or 8, wherein if the UL or DL communication and the SL communication are on the different carriers and the different carriers are inter-band, the one or more conditions include component carriers (CCs) for the UL or DL communication and the SL communication being separated by a frequency band.

Aspect 10. The method of any one of aspects 1-9, further comprising receiving an indication of a capability of the UE with respect to the UL or DL communication overlapping in the time domain with the SL communication, wherein the first configuration and the second configuration are further determined based on the capability of the UE, the capability being specific to each of at least one of conditions: the SL communication being in a first frequency range (FR1) and the UL or DL communication being in a second frequency range (FR2); the SL communication being in the FR2 and the UL or DL communication being in the FR1; the SL communication being in the FR1 and the UL or DL communication being in the FR1; or any combination thereof.

Aspect 11. The method of any one of aspects 1-10, further comprising receiving an indication of a capability of the UE with respect to the UL or DL communication overlapping in the time domain with the SL communication, the capability being indicated separately for at least one of different bands, band combinations, the UL or DL communication and the SL communication being synchronous, the UL or DL communication and the SL communication being asynchronous, or any combination thereof.

Aspect 12. A method for wireless communication by a user-equipment (UE), comprising: receiving a first configuration for sidelink (SL) communication by the UE; receiving a second configuration for uplink (UL) or downlink (DL) communication by the UE; determining whether the first configuration and the second configuration allow the UL or DL communication to overlap in time domain with the SL communication on same or different carriers based on one or more conditions; and communicating signaling for at least one of the SL communication or the UL or DL communication based on the determination.

Aspect 13. The method of aspect 12, further comprising determining whether to forgo the SL communication or the UL or DL communication if the first configuration and the second configuration do not allow the UL or DL communication to overlap in the time domain with the SL communication.

Aspect 14. The method of aspect 13, wherein the determining of whether to forgo one of the SL communication and the UL or DL communication is based on a priority associated with each of the SL communication and the UL or DL communication.

Aspect 15. The method of any one of aspects 12-14, wherein, if bandwidth parts (BWPs) for the UL or DL communication and the SL communication are on the same carrier, the first configuration and the second configuration allow the UL or DL communication to overlap in the time domain if the one or more conditions include the same sub-carrier spacing (SCS) being configured for the UL or DL communication as the SL communication.

Aspect 16. The method of aspect 15, wherein the first configuration and the second configuration allow the UL or DL communication to overlap in the time domain further if: the UL or DL communication comprises DL reception by the UE; and the SL communication comprises SL reception by the UE.

Aspect 17. The method of any one of aspects 12-16, wherein, if BWPs for the UL or DL communication and the SL communication are on the same carrier, the first configuration and the second configuration allow the UL or DL communication to overlap in the time domain if the one or more conditions include: the UL or DL communication and the SL communication being configured with the same waveform; the BWP for the SL communication being configured within a BWP for the UL or DL communication; or any combination thereof.

Aspect 18. The method of aspect 17, wherein the first configuration and the second configuration allow the UL or DL communication to overlap in the time domain further if: the UL or DL communication comprises UL transmission by the UE; and the SL communication comprises SL transmission by the UE.

Aspect 19. The method of any one of aspects 12-14, wherein, if BWPs for the UL or DL communication and the SL communication are on different carriers and the different carriers are intra-band, the first configuration and the second configuration allow the UL or DL communication to overlap in the time domain if the one or more conditions include: transmit timing via cells associated with the SL communication and the UL or DL communication being configured within a maximum transmitted time difference (MTTD) threshold; the same sub-carrier spacing (SCS) is configured for the UL or DL communication as the SL communication; the UL or DL communication and the SL communication are configured with the same waveform; component carriers for the UL or DL communication and the SL communication are configured in the same timing advance group (TAG); component carriers for the UL or DL communication and the SL communication are configured to be contiguous: transmission powers for the UL or DL communication and the SL communication are configured within a threshold margin; an average power per physical resource block (PRB) for component carriers of the UL or DL communication and the SL communication are configured to be the same; or any combination thereof.

Aspect 20. The method of aspect 19, wherein the first configuration and the second configuration allow the UL or DL communication to overlap in the time domain further if: the UL or DL communication comprises UL transmission by the UE; and the SL communication comprises sidelink transmission by the UE.

Aspect 21. The method of any one of aspects 12-14 and 19-20, wherein: if the UL or DL communication and the SL communication are on the different carriers and the different carriers are intra-band, the first configuration and the second configuration allow the UL or DL communication to overlap in the time domain if the one or more conditions include using the same sub-carrier spacing (SCS) for the UL or DL communication as the SL communication; and the first configuration and the second configuration allow the UL or DL communication to overlap in the time domain further if: the UL or DL communication comprises DL reception by the UE; and the SL communication comprises SL reception by the UE.

Aspect 22. The method of any one of aspects 12-14 and 19-20, wherein if the UL or DL communication and the SL communication are on the different carriers and the different carriers are inter-band, the first configuration and the second configuration allow the UL or DL communication to overlap in the time domain if component carriers (CCs) configured for the UL or DL communication and the SL communication are separated by a frequency band.

Aspect 23. The method of any one of aspects 12-22, further comprising transmitting an indication of a capability of the UE with respect to the UL or DL communication overlapping in the time domain with the SL communication, the capability being specific to each of at least one of conditions: the SL communication being in a first frequency range (FR1) and the UL or DL communication being in a second frequency range (FR2); the SL communication being in the FR2 and the UL or DL communication being in the FR1; the SL communication being in the FR1 and the UL or DL communication being in the FR1, wherein the first configuration and the second configuration allow the UL or DL communication to overlap in the time domain if the first configuration and the second configuration are in accordance with the capability of the UE; or any combination thereof.

Aspect 24. The method of any one of aspects 12-23, further comprising transmitting an indication of a capability of the UE with respect to the UL or DL communication overlapping in the time domain with the SL communication, the capability being indicated separately for at least one of different bands, band combinations, the UL or DL communication and the SL communication being synchronous, the UL or DL communication and the SL communication being asynchronous, or any combination thereof.

Aspect 25. An apparatus comprising means for performing the method of any of aspects 1 through 24.

Aspect 26. An apparatus comprising at least one processor and a memory coupled to the at least one processor, the memory comprising code executable by the at least one processor to cause the apparatus to perform the method of any of aspects 1 through 24.

Aspect 27. A computer readable medium storing computer executable code thereon for wireless communications that, when executed by at least one processor, cause an apparatus to perform the method of any of aspects 1 through 24.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a base station, comprising:
determining a first configuration for sidelink (SL) communication for a user-equipment (UE);
determining a second configuration for uplink (UL) or downlink (DL) communication for the UE, the first configuration and the second configuration being determined to allow the UL or DL communication to overlap in time domain with the SL communication on same or different carriers based on one or more conditions, wherein transmit timing associated with the SL communication and the UL or DL communication are within a maximum transmitted time difference (MTTD) threshold; and
transmitting the first configuration and the second configuration to the UE.

2. The method of claim 1, wherein, when bandwidth parts (BWPs) for the UL or DL communication and the SL communication are on the same carrier, the first configuration and the second configuration are determined based on the one or more conditions that the same sub-carrier spacing (SCS) is to be used for the UL or DL communication as the SL communication.

3. The method of claim 2, wherein the one or more conditions include the same SCS is to be used for the UL or DL communication as the SL communication when the UL or DL communication comprises DL reception by the UE and the SL communication comprises SL reception by the UE.

4. The method of claim 1, wherein, when BWPs for the UL or DL communication and the SL communication are on the same carrier, the one or more conditions include: the UL or DL communication and the SL communication have the same waveform; the BWP for the SL communication is within a BWP for the UL or DL communication; or any combination thereof.

5. The method of claim 4, wherein the first configuration and the second configuration are determined based on the one or more conditions when: the UL or DL communication comprises UL transmission by the UE; and the SL communication comprises SL transmission by the UE.

6. The method of claim 1, wherein, when BWPs for the UL or DL communication and the SL communication are on different carriers and the different carriers are intra-band, the one or more conditions include: the same sub-carrier spacing (SCS) is to be used for the UL or DL communication as the SL communication; the UL or DL communication and the SL communication have the same waveform; component carriers for the UL or DL communication and the SL communication are in the same timing advance group (TAG); component carriers for the UL or DL communication and the SL communication are contiguous: transmission powers for the UL or DL communication and the SL communication are within a threshold margin; an average power per physical resource block (PRB) for component carriers of the UL or DL communication and the SL communication are the same; or any combination thereof.

7. The method of claim 6, wherein the first configuration and the second configuration are determined based on the one or more conditions when:
the UL or DL communication comprises UL transmission by the UE; and the SL communication comprises sidelink transmission by the UE.

8. The method of claim 1, wherein: when the UL or DL communication and the SL communication are on the different carriers, the one or more conditions include using the same sub-carrier spacing (SCS) for the UL or DL communication as the SL communication; and the first configuration and the second configuration are determined based on the one or more conditions when: the UL or DL communication comprises DL reception by the UE; and the SL communication comprises SL reception by the UE.

9. The method of claim 1, wherein when the UL or DL communication and the SL communication are on the different carriers and the different carriers are inter-band, the one or more conditions include component carriers (CCs) for the UL or DL communication and the SL communication being separated by a frequency band.

10. The method of claim 1, further comprising receiving an indication of a capability of the UE with respect to the UL or DL communication overlapping in the time domain with the SL communication, wherein the first configuration and the second configuration are further determined based on the capability of the UE, the capability being specific to each of at least one of conditions: the SL communication being in a first frequency range (FR1) and the UL or DL communication being in a second frequency range (FR2); the SL communication being in the FR2 and the UL or DL communication being in the FR1; the SL communication being in the FR1 and the UL or DL communication being in the FR1; or any combination thereof.

11. The method of claim 1, further comprising receiving an indication of a capability of the UE with respect to the UL or DL communication overlapping in the time domain with the SL communication, the capability being indicated separately for at least one of different bands, band combinations, the UL or DL communication and the SL communication being synchronous, the UL or DL communication and the SL communication being asynchronous, or any combination thereof.

12. A method for wireless communication by a user-equipment (UE), comprising:
receiving a first configuration for sidelink (SL) communication by the UE;
receiving a second configuration for uplink (UL) or downlink (DL) communication by the UE;
determining whether the first configuration and the second configuration allow the UL or DL communication to overlap in time domain with the SL communication on same or different carriers based on one or more conditions, wherein transmit timing associated with the SL communication and the UL or DL communication are within a maximum transmitted time difference (MTTD) threshold; and
communicating signaling for at least one of the SL communication or the UL or DL communication based on the determination.

13. The method of claim 12, further comprising determining whether to forgo the SL communication or the UL or DL communication when the first configuration and the second configuration do not allow the UL or DL communication to overlap in the time domain with the SL communication.

14. The method of claim 13, wherein the determining of whether to forgo one of the SL communication and the UL or DL communication is based on a priority associated with each of the SL communication and the UL or DL communication.

15. The method of claim 12, wherein, when bandwidth parts (BWPs) for the UL or DL communication and the SL communication are on the same carrier, the first configuration and the second configuration allow the UL or DL communication to overlap in the time domain when the one or more conditions include the same sub-carrier spacing (SCS) being configured for the UL or DL communication as the SL communication.

16. The method of claim 15, wherein the first configuration and the second configuration allow the UL or DL communication to overlap in the time domain further when: the UL or DL communication comprises DL reception by the UE; and the SL communication comprises SL reception by the UE.

17. The method of claim 12, wherein, when BWPs for the UL or DL communication and the SL communication are on the same carrier, the first configuration and the second configuration allow the UL or DL communication to overlap in the time domain when the one or more conditions include: the UL or DL communication and the SL communication being configured with the same waveform; the BWP for the SL communication being configured within a BWP for the UL or DL communication; or any combination thereof.

18. The method of claim 17, wherein the first configuration and the second configuration allow the UL or DL communication to overlap in the time domain further when: the UL or DL communication comprises UL transmission by the UE; and
the SL communication comprises SL transmission by the UE.

19. The method of claim 12, wherein, when BWPs for the UL or DL communication and the SL communication are on different carriers and the different carriers are intra-band, the first configuration and the second configuration allow the UL or DL communication to overlap in the time domain when the one or more conditions include:
the same sub-carrier spacing (SCS) is configured for the UL or DL communication as the SL communication;
the UL or DL communication and the SL communication are configured with the same waveform;
component carriers for the UL or DL communication and the SL communication are configured in the same timing advance group (TAG);
component carriers for the UL or DL communication and the SL communication are configured to be contiguous:
transmission powers for the UL or DL communication and the SL communication are configured within a threshold margin;
an average power per physical resource block (PRB) for component carriers of the UL or DL communication and the SL communication are configured to be the same; or any combination thereof.

20. The method of claim 19, wherein the first configuration and the second configuration allow the UL or DL communication to overlap in the time domain further when: the UL or DL communication comprises UL transmission by the UE; and
the SL communication comprises sidelink transmission by the UE.

21. The method of claim 12, wherein: when the UL or DL communication and the SL communication are on the different carriers and the different carriers are intra-band, the first configuration and the second configuration allow the UL or DL communication to overlap in the time domain when the one or more conditions include using the same sub-carrier spacing (SCS) for the UL or DL communication as the SL communication; and the first configuration and the second configuration allow the UL or DL communication to overlap in the time domain further when: the UL or DL communication comprises DL reception by the UE; and the SL communication comprises SL reception by the UE.

22. The method of claim 12, wherein when the UL or DL communication and the SL communication are on the different carriers and the different carriers are inter-band, the first configuration and the second configuration allow the UL or DL communication to overlap in the time domain when component carriers (CCs) configured for the UL or DL communication and the SL communication are separated by a frequency band.

23. The method of claim 12, further comprising transmitting an indication of a capability of the UE with respect to the UL or DL communication overlapping in the time domain with the SL communication, the capability being specific to each of at least one of conditions: the SL communication being in a first frequency range (FR1) and the UL or DL communication being in a second frequency range (FR2);
the SL communication being in the FR2 and the UL or DL communication being in the FRl;
the SL communication being in the FR1 and the UL or DL communication being in the FRl, wherein the first configuration and the second configuration allow the UL or DL communication to overlap in the time domain when the first configuration and the second configuration are in accordance with the capability of the UE; or any combination thereof.

24. The method of claim 12, further comprising transmitting an indication of a capability of the UE with respect to the UL or DL communication overlapping in the time domain with the SL communication, the capability being indicated separately for at least one of different bands, band combinations, the UL or DL communication and the SL communication being synchronous, the UL or DL communication and the SL communication being asynchronous, or any combination thereof.

25. An apparatus for wireless communication by a base station, comprising: a memory; and one or more processors coupled to the memory, the one or more processors individually or collectively configured to cause the apparatus to: determine a first configuration for sidelink (SL) communication for a user-equipment (UE); determine a second configuration for uplink (UL) or downlink (DL) communication for the UE, the first configuration and the second configuration being determined to allow the UL or DL communication to overlap in time domain with the SL communication on same or different carriers based on one or more conditions, wherein transmit timing associated with the SL communication and the UL or DL communication are within a maximum transmitted time difference (MTTD) threshold; and transmit the first configuration and the second configuration to the UE.

26. An apparatus for wireless communication by a user-equipment (UE), comprising: a memory; and one or more processors coupled to the memory, the one or more processors individually or collectively configured to cause the apparatus to: receive a first configuration for sidelink (SL) communication by the UE; receive a second configuration for uplink (UL) or downlink (DL) communication by the UE; determine whether the first configuration and the second configuration allow the UL or DL communication to overlap in time domain with the SL communication on same or different carriers based on one or more conditions, wherein transmit timing associated with the SL communication and the UL or DL communication are within a maximum transmitted time difference (MTTD) threshold; and communicate signaling for at least one of the SL communication or the UL or DL communication based on the determination.

* * * * *